No. 74,242. PATENTED FEB. 11, 1868.
C. PAYNE & B. VANDECAR.
COTTON PICKER.
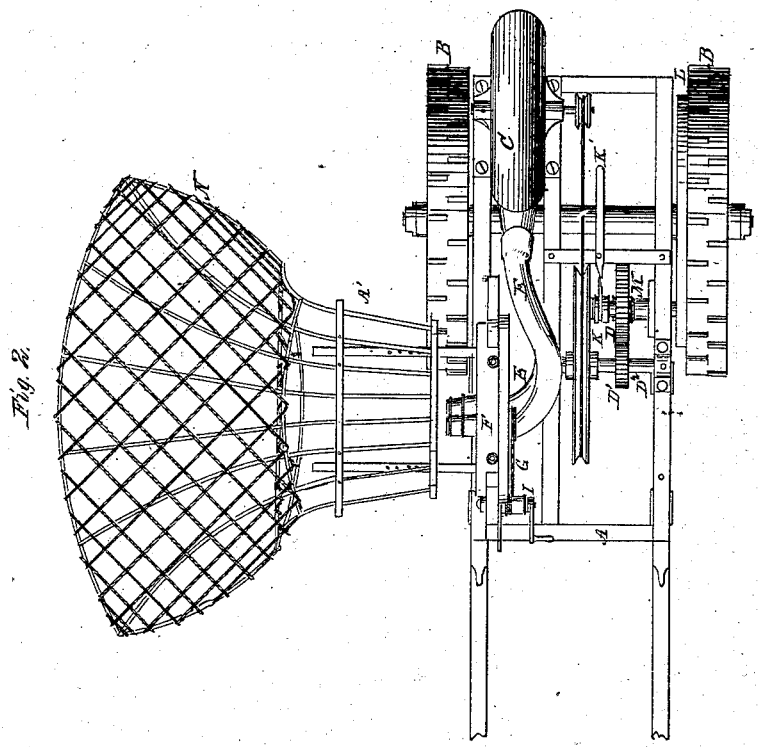
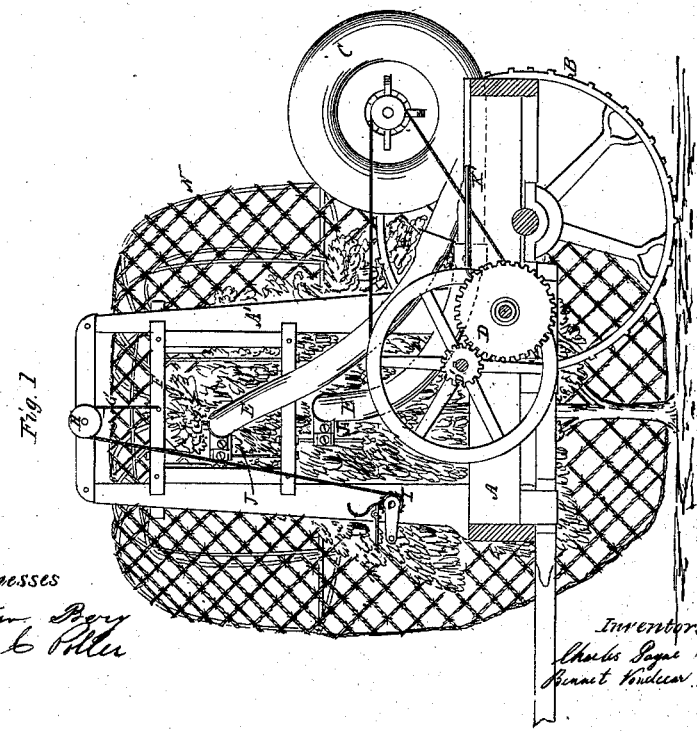

United States Patent Office.

CHARLES PAYNE, OF BRANDON, VERMONT, AND BENNET VANDECAR, OF WATERFORD, NEW YORK.

*Letters Patent No. 74,212, dated February 11, 1868.*

---

IMPROVEMENT IN COTTON-PICKERS.

---

*The Schedule referred to in these Letters Patent and making part of the same.*

---

TO ALL WHOM IT MAY CONCERN:

Be it known that we, CHARLES PAYNE, of Brandon, county of Rutland, State of Vermont, and BENNET VANDECAR, of Waterford, in the county of Saratoga, and in the State of New York, have invented a new and useful Improvement in Machines for Gathering Cotton; and we do hereby declare that the following is a full, clear, and exact description thereof, which will enable those skilled in the art to make and use the same, reference being had to the accompanying drawing, forming part of this specification, in which drawing—

Figure 1 represents a longitudinal section of the machine.

Figure 2 is a plan view.

This invention consists in gathering cotton by the use of a blast or currents of air, which are directed against the bolls in such a manner as to separate the cotton from the stalks, and propel or carry them into a suitable receptacle.

The letter A designates a frame, which is supported upon wheels B, whose periphery is roughened to prevent them from slipping on the ground. The front of the frame is provided with thills to allow a horse to be attached to the machine. Upon the axle of the running-wheels B, I place a wheel, L, of less diameter, which is connected to, so as to revolve with said wheels B when the machine is moving forwards, by a pawl that engages teeth on the hub of one of them, said pawl slipping over said teeth when the machine is moved backwards. This device for turning wheel L is common to some other agricultural machines, and I, therefore, have not considered it necessary to represent the same in the drawing. The wheel L has an inside gear, which engages with a pinion placed on the outer end of shaft M, and through it turns that shaft. Said shaft M carries a loose gear-wheel, D, which engages with a gear-wheel, $D^1$, on a parallel shaft, $D^2$, which carries a large driving-pulley that is connected by a band to a small pulley fixed on the shaft of a fan enclosed in a fan-case, C. The shaft M has on it a sliding clutch, K, which is connected to the shaft by a feather and groove, or equivalent device, so that it must always revolve with said shaft, and, by moving said clutch by means of arm $k'$ into engagement with a counter-clutch formed on the hub of wheel D, the motion of the shaft is communicated to said wheel D, and the fan is thereby revolved. A high speed is given to the fan by the usual means of combining gear-wheels and pulleys of larger and small diameters. The fan-case C has openings in its circumference, in which are secured elastic or flexible pipes or tubes E, one or more, as may be desired. We have shown two in this example. Their nozzles are hung in a sliding frame, F, which is arranged to slide up and down in the extension A' of the frame of the machine, the object being to adjust or move the nozzles of the pipes to a higher or lower elevation, according to the height of the cotton in the field. The sliding frame F is raised by means of a winch, I, and rope, G, the latter going over a pulley, H, on the upper part of the extension A'. The winch I is placed at a point convenient of access to the driver, for whom a seat may be arranged on the front part of the frame A. The nozzles of the pipes or tubes are connected to the sliding frame F by means of vertical spindles or rods J, fixed in the cross-bars of said frame, which rods go through ears that project from the sides of the nozzles, or from collars placed around the nozzles. In this example, we have formed the ears on such collars. The ears are made fast to the rods by set-screws, by loosening which the nozzles can be set higher or lower on the rods independently of the movements of the sliding frame. The rods are so arranged in the sliding frame that they can turn on their centres, and consequently the nozzles are permitted to vibrate or turn in horizontal directions, so as to give a wider sweep to the blasts of air that issue from them.

The extension part A' of the machine has a lateral branch, seen in fig. 2, which projects far enough to extend beyond the row of cotton that is to be operated upon, the lateral branch being made high enough to go over its top. The said branch of the extension supports, at its outer end, a receptacle for the cotton, to receive it as it is blown off the plants by the currents of air from the pipes or tubes. In this example the receptacle consists of a bag, N, which hangs down, so as to enclose a row of cotton-plants between it and the rest of the machine, the upper part of the bag being distended on a wire frame, which combines lightness with stiffness, and enables us to give a suitable form to the upper portion of the bag, so that the bag can easily pass between adjacent rows of plants, and be kept in proper position opposite the nozzles of the pipes, the face of the bag opposite to them being entirely open, or having a wide mouth, through which the cotton is blown when it is separated from the stalk by the force of the blasts of air. When the bag is filled with cotton, it is replaced by a fresh bag, or else it is emptied and retained on the machine. It can be emptied from its bottom by making its lower part capable of being opened. The bag is made of net-work or cloth, or other light material.

The running-gear and frame of the machine are of such narrow dimensions as will allow the same to be drawn or propelled between adjacent rows of cotton-plants, and any suitable mode of propulsion or draught can be used to take it through the field. The pipes E can be made of rigid material, provided they are so jointed as to be capable of being bent.

The application of blasts or currents of air to bolls of cotton can be made in various other ways, and the mechanism of the machine and the fan or fans and air-pipes can all be modified by the ingenious or skillful mechanic. We therefore do not confine ourselves to any particular devices for carrying out our invention, but we claim broadly the application of blasts of air to cotton to blow off the fibres from the stalks or bolls of the plants.

What we claim as new, and desire to secure by Letters Patent, is—

1. Removing cotton from the bolls by blowing it off away from the air-pipes, in contradistinction to drawing it into the air-pipes by suction, substantially as shown.

2. The combination of a fan, or its equivalent, with elastic or flexible pipes or tubes E, and a sliding frame, F, to raise or lower their nozzles, substantially as and for the purpose described.

3. The combination of the rotating spindles J in the sliding frame F with the nozzles of the pipes E, substantially as described.

4. The extension A' of the frame of the machine, in combination with the sliding frame F and the bag N, substantially as described.

5. The combination, with the air-pipes E, of the bag N, which receives the cotton blown off the stalks of the plants, substantially as described.

CHARLES PAYNE,
BENNET VANDECAR.

Witnesses:
  J. Q. HAWKINS,
  GEO. L. FLETCHER.
  C. A. WALDRON,
  JOHN S. THURBER, } as to VANDECAR.